United States Patent [19]
Dick

[11] 3,908,552
[45] Sept. 30, 1975

[54] FUZE SIGNAL PROCESSING CIRCUIT

[75] Inventor: John O. Dick, Riverside, Calif.

[73] Assignee: The United States of America as represented by the Secretary of the Navy, Washington, D.C.

[22] Filed: July 7, 1964

[21] Appl. No.: 380,957

[52] U.S. Cl............................................ 102/70.2 P
[51] Int. Cl.[2]........................................ F42C 13/02
[58] Field of Search .......... 328/114, 118, 135, 162, 328/165; 317/79, 80; 102/70.2; 250/83.3 IR

[56] References Cited
UNITED STATES PATENTS

| | | | |
|---|---|---|---|
| 2,730,615 | 1/1956 | Mantz................................. | 328/114 |
| 3,073,966 | 1/1963 | Chrzanowski....................... | 307/88.5 |
| 3,151,299 | 9/1964 | Smith.................................. | 328/162 |
| 3,204,188 | 11/1965 | Falk.................................... | 328/162 |
| 3,225,213 | 12/1965 | Hinrichs............................. | 328/135 |

Primary Examiner—Samuel Feinberg
Assistant Examiner—C. T. Jordan
Attorney, Agent, or Firm—Richard S. Sciascia; Joseph M. St. Amand; T. M. Phillips

EXEMPLARY CLAIM

1. In a fuze system having an infrared detector means and a firing circuit means, the improvement comprising a processing circuit that is not influenced by the high degree of modulation present in the signals from said detector means as the result of said detector scanning a jet engine exhaust plume, said processing circuit comprising:

a. an input terminal connected to and to receive an input signal proportional to infrared energy received from said infrared detector means as the jet engine exhaust plume is scanned by said detector,
   b. a first diode coupled to said input terminal and being polarized to pass a negative going and to block positive signals,
   c. a storage capacitor coupled to said diode and being charged to peak amplitude of said input signal,
   d. an output terminal connected to said firing circuit means,
   e. a normally closed gate circuit coupled across said storage capacitor and coupled to said output terminal,
   f. a second diode coupling said input terminal to said gate circuit and being polarized to pass a positive voltage to open said gate circuit and discharge said storage capacitor in response to a positive overshoot at the termination of said input signal.

1 Claim, 1 Drawing Figure

U.S. Patent  Sept. 30,1975  3,908,552
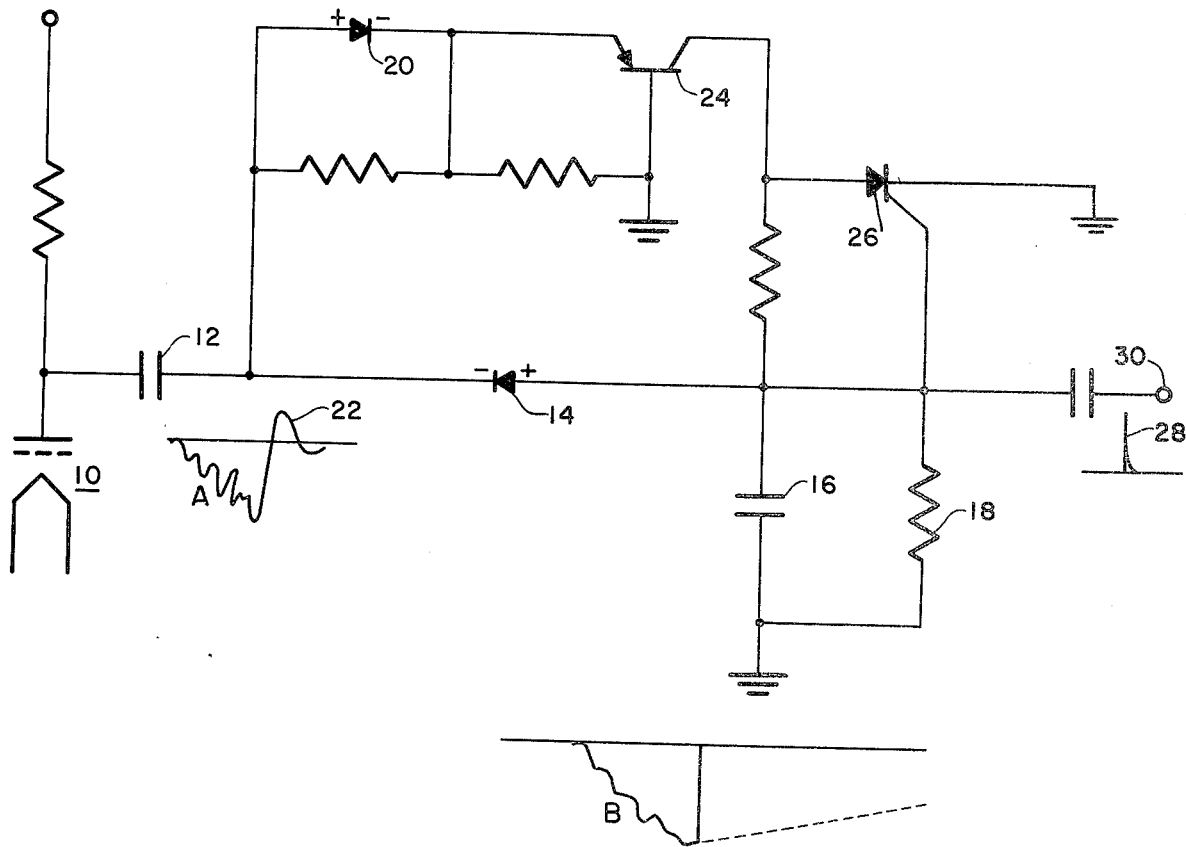
JOHN O. DICK
INVENTOR.
BY
ATTORNEYS

FUZE SIGNAL PROCESSING CIRCUIT

The invention herein described may be manufactured and used by or for the Government of the United States of America for governmental purposes without the payment of any royalties thereon or therefor.

The present invention relates to that portion of a passive infrared actuated type fuzing system that processes the intercepted signal and makes the decision as to the correct time to actuate the firing of the missile warhead.

In the past it has been assumed that the signal shape in general is that of a sawtooth or exponentially increasing voltage waveform. The termination of the waveform (as the detector passes the jet engine tailpipe) is a sharply decreasing fall off to zero as the IR source seen by the detector disappears from the detector field of view. Prior circuitry has simply differentiated this waveform by means of a resistor-capacitor coupling network to select the sharp voltage transition occurring at intercept.

It has recently been determined that the target envelope as seen by the detector may not be the clean waveform as previously assumed. Recent tests have disclosed the fact that the target envelope of the jet engine exhaust plume may contain a high degree of modulation (up to 40 percent).

Due to the wide dynamic range required in fuzing systems, the magnitude of the modulation spikes described above may be much larger than the minimum signal necessary to produce fuze actuation. In addition, due to the wide range of intercept velocities and signal pulse width, there is no way in which the signal processing circuitry can distinguish between a true signal and the above modulation. The result of this is that the fuze may fire prematurely upon the modulation and thus fail to destroy the intended target.

Prior fuzing systems utilize the trailing edge of the intercept signal waveform as a timing reference point for detonating the missile warhead. The trailing edge of the signal is located by differentiation of the intercept signal in a resistor-capacitor coupling network.

An object of the present invention is to provide a fuze signal processing circuit which is not influenced by the high degree of modulation present in the target envelope signal as a result of the jet engine exhaust plume.

Another object of the invention is the provision of a fuze signal processing circuit that assures a more precise point of firing of the fuze by accurately determining the exact point of signal fall off.

A further object is to provide a fuze signal processing circuit that minimizes the probability of dudding due to long pulse width signals obtained during slow-missile-to-target overtake velocities.

Other objects and many of the attendant advantages of this invention will become readily appreciated as the same becomes better understood by reference to the single FIGURE of drawing which shows a schematic diagram of a preferred embodiment of the invention.

Referring now to the drawing there is shown the final amplifier stage 10 of an IR fuzing system (not shown) which provides the signal waveform A. Because of the large modulation or serrations present in waveform A, a resistor-capacitor differentiating circuit would produce a premature pulse which would fire the fuze.

Waveform signal A is coupled through capacitor 12 and silicon diode 14 to produce a charge upon capacitor 16 as shown by waveform B. Diode 14 is polarized so that a negative going signal is passed by the forward conductance of diode 14 but positive signals are blocked, thus, storing the negative peaks of waveform A in capacitor 16. At the termination of the intercept waveform A, the peak amplitude of the signal is stored in capacitor 16 and held by choosing the values of capacitor 16 and resistor 18 to have a long time constant.

The signal across capacitor 12 is fed in a parallel path to diode 20, but because of its reversed polarity will not conduct until the termination of the signal which has an overshoot 22 produced by the amplifier 10 circuitry. This positive signal is coupled by diode 20 and applied to the emitter of a transistor amplification stage 24. Transistor 24 is connected as a grounded base amplifier stage, thus the positive signal applied to its emitter turns it on and applies a trigger to the gate of silicon controlled rectifier (SCR) 26. The trigger at SCR 26 turns it on permitting capacitor 16 to discharge and produce a sharp positive spike 28 at terminal 30 for the firing circuit (not shown).

Obviously many modifications and variations of the present invention are possible in the light of the above teachings. It is therefore to be understood that within the scope of the appended claims the invention may be practiced otherwise than as specifically described.

What is claimed is:

1. In a fuze system having an infrared detector means and a firing circuit means, the improvement comprising a processing circuit that is not influenced by the high degree of modulation present in the signals from said detector means as the result of said detector scanning a jet engine exhaust plume, said processing circuit comprising:
   a. an input terminal connected to and to receive an input signal proportional to infrared energy received from said infrared detector means as the jet engine exhaust plume is scanned by said detector,
   b. a first diode coupled to said input terminal and being polarized to pass a negative going and to block positive signals,
   c. a storage capacitor coupled to said diode and being charged to peak amplitude of said input signal,
   d. an output terminal connected to said firing circuit means,
   e. a normally closed gate circuit coupled across said storage capacitor and coupled to said output terminal,
   f. a second diode coupling said input terminal to said gate circuit and being polarized to pass a positive voltage to open said gate circuit and discharge said storage capacitor in response to a positive overshoot at the termination of said input signal.

* * * * *